(12) United States Patent
Taner et al.

(10) Patent No.: US 7,085,195 B2
(45) Date of Patent: Aug. 1, 2006

(54) METHOD FOR DETECTING EARTH FORMATION FRACTURES BY SEISMIC IMAGING OF DIFFRACTORS

(75) Inventors: M. Turhan Taner, Houston, TX (US); Evgeny Landa, Pau (FR)

(73) Assignee: RDSP I, L.P., Houston, TX (US)

( * ) Notice: Subject to any disclaimer, the term of this patent is extended or adjusted under 35 U.S.C. 154(b) by 146 days.

(21) Appl. No.: 10/813,577

(22) Filed: Mar. 30, 2004

(65) Prior Publication Data

US 2005/0219949 A1   Oct. 6, 2005

(51) Int. Cl.
*G01V 1/28* (2006.01)

(52) U.S. Cl. .......................... 367/50; 367/38; 367/40; 367/75; 702/14

(58) Field of Classification Search ............ 367/36–38, 367/40, 50, 75
See application file for complete search history.

(56) References Cited

U.S. PATENT DOCUMENTS 5,610,875 A * 3/1997 Gaiser .................. 367/75

6,292,754 B1 * 9/2001 Thomsen ...................... 702/14
6,785,612 B1 * 8/2004 Zhang ........................... 702/14
6,826,484 B1 * 11/2004 Martinez et al. .............. 702/14
6,862,531 B1 * 3/2005 Horne et al. .................. 702/14

OTHER PUBLICATIONS

Dellinger, et al. "Efficient 2.5 D true0amplitude migration." Geophysics, Feb. 15, 2000.*
Lou, et al. "Velocity Update via Joint Velocity Inversion for Anisotropic Depth Migration."*
Sun and Martinez. "Amplitude Preserving 3D pre-stack Kirchoff time migration for V(z) and VTI media."*
Li and Pham. "Land data migration from rugged topography."*

* cited by examiner

*Primary Examiner*—Mark Hellner
*Assistant Examiner*—Scott A. Hughes
(74) *Attorney, Agent, or Firm*—Richard A. Fagin

(57) ABSTRACT

A method is disclosed for seismic imaging of subsurface diffractors. The method includes performing migration velocity analysis on a seismic time record section and depth migrating the time section for offsets exceeding one-half a distance between a seismic energy source and a seismic receiver most distant from the source during acquisition of seismic data used to generate the time record section.

6 Claims, 8 Drawing Sheets

METHOD FOR DETECTING EARTH FORMATION FRACTURES BY SEISMIC IMAGING OF DIFFRACTORS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic exploration of the Earth's subsurface. More particularly, the invention relates to methods for processing seismic signals for the purpose of identifying and/or locating fractures in the Earth's subsurface.

2. Background Art

Seismic exploration of the Earth's subsurface is used for, among other purposes, determining the structure, mineral composition and/or fluid content of subsurface formations. Generally, seismic exploration methods known in the art include deploying one or more seismic energy sources at selected positions on or near the Earth's surface, and deploying an array of seismic sensors on or near the Earth's surface at known positions proximate to the seismic energy source(s). When seismic exploration is performed on land, the seismic energy sources are typically explosives or vibrators, and the seismic sensors are typically geophones disposed at spaced apart locations along a sensor cable. When seismic exploration performed in a body of water, the source(s) may be an air gun or array of air guns, water guns or explosives, and the sensors are typically hydrophones disposed along a "streamer" cable towed in the water near the water surface. For both land and water seismic exploration, Periodically, the sources are actuated, and signals detected by the sensors in the array are recorded. The recorded signals are indexed with respect to the time of actuation of the source.

Seismic energy emanates outwardly from the seismic energy source, and travels through the subsurface formations until it reaches a subsurface acoustic impedance boundary. At the boundary, some of the seismic energy is reflected back toward the surface where it is detected by the sensors. Structure and composition of the subsurface Earth formations is inferred by various characteristics of the detected seismic energy, including seismic energy travel time from the source to each detector, and the phase, amplitude and frequency content of the detected seismic energy, among other characteristics.

An important assumption concerning the propagation of seismic energy through the Earth from the source to the detectors is that the Earth consists of substantially horizontally layered, laterally continuous media that have lateral extent greater than the lineal distance between the source and the most distant one of the seismic detectors. It is also assumed that a substantial portion of the detected seismic energy results from so-called "specular" reflections of the seismic energy at one or more acoustic impedance boundaries in the subsurface. A specular reflection is defined as "a sharply defined beam resulting from reflection off a smooth surface."

Such assumptions about the subsurface structure of the Earth result in methods for generating images of the Earth's subsurface structure that are limited to one-half the lineal distance between the source and the most distant detector. Imaging other parts of the Earth's subsurface is thus typically performed by moving the seismic source and the detectors and repeating the signal acquisition techniques described above.

It is known in the art that some types of subsurface Earth structures do not fit the foregoing assumptions of lateral continuity and horizontal layering. In particular, so-called "fractured" formations typically are not well represented by a model based on laterally continuous, horizontally layered media. Fractured formations may have very limited or irregularly distributed lateral extent, they may be oriented other than horizontally, and they may have unknown geographic compass direction (azimuth) with respect to their lateral extent.

Determining the existence of and areal extent of fractured formations is of continuing interest in subsurface Earth exploration because valuable resources, such as petroleum, are frequently associated with fractured formations. Methods are known in the art for evaluating fractured Earth formations. See, for example, Kanasewich, E. R., et al., *Imaging discontinuities on seismic sections*, Geophysics, vol. 53, no. 3, pp. 334–345, Society of Exploration Geophysicists (1988); Landa, E. et al., *Seismic monitoring of diffraction images for detection of local heterogeneities*, Geophysics, vol. 63, no. 3, pp. 1093–1100, Society of Exploration Geophysicists (1998); and Khaidukov, V. et al., *Diffraction imaging by a focusing-defocusing approach*, transactions of the $73^{rd}$ annual meeting, Society of Exploration Geophysicists (2001).

More recently, a number of publications have been made concerning methods for evaluating subsurface fractures. For example, at a geophysical science conference held in 2003, more than twenty papers were presented on the subject of fractures. See, *Transactions of the $75^{th}$ annual meeting*, Society of Exploration Geophysicists (2003). A number of the papers from the above conference describe methods adapted from seismic signal processing "edge detection" techniques. Other papers from the foregoing conference describe azimuthal amplitude versus offset (AVO) techniques for fracture orientation determination. However, azimuthal AVO data are not available for all areas. Furthermore, azimuthal AVO has not proven to be particularly effective in marine seismic data recording and analysis, unless some specially designed recording methods and systems are used, for example, four component (4C) ocean bottom cables (OBCs). Examples of using ocean bottom cables are described in several references. One such technique is described in U.S. Pat. No. 4,486,865 issued to Ruehle. Pairs of detectors each comprise a geophone and a hydrophone. A filter is applied to the output of at least one of the geophone or hydrophone in each pair so that the frequency content of the filtered signal is adjusted. The adjustment to the frequency content is such that when the filtered signal is combined with the signal from the other sensor, the ghost reflections cancel. U.S. Pat. No. 5,621,700 issued to Moldovenu also discloses using at least one pair of sensors in a method for attenuating ghosts and water layer reverberations. U.S. Pat. No. 4,935,903 issued to Sanders et al. discloses a method for reducing the effects of water later reverberations which includes measuring pressure at vertically spaced apart depths, or by measuring pressure and particle motion using sensor pairs. The method includes enhancing primary reflection data for use in pre-stack processing by adding ghost data. U.S. Pat. No. 4,979,150 discloses a method for marine seismic exploration in which output of substantially collocated hydrophones and geophones are subjected to a scale factor. The collocated hydrophones and geophones can be positioned at the sea floor or above the sea floor.

However, OBC data are not available in all areas, and acquisition and processing of OBC data continues to be relatively difficult and expensive. Thus there continues to be a need for effective imaging of subsurface diffractors, including fractured zones, which does not require specialized data recording techniques or equipment, and may be applicable to seismic data recorded using older acquisition techniques wherein AVO analysis may not be possible.

SUMMARY OF THE INVENTION

One aspect of the invention is method for seismic imaging of subsurface diffractors. The method includes performing migration velocity analysis on a seismic time record section and depth migrating the time section for offsets exceeding one-half a distance between a seismic energy source and a seismic receiver most distant from the source during acquisition of seismic data used to generate the time record section.

Other aspects and advantages of the invention will be apparent from the following description and the appended claims.

DETAILED DESCRIPTION

Figure 1:
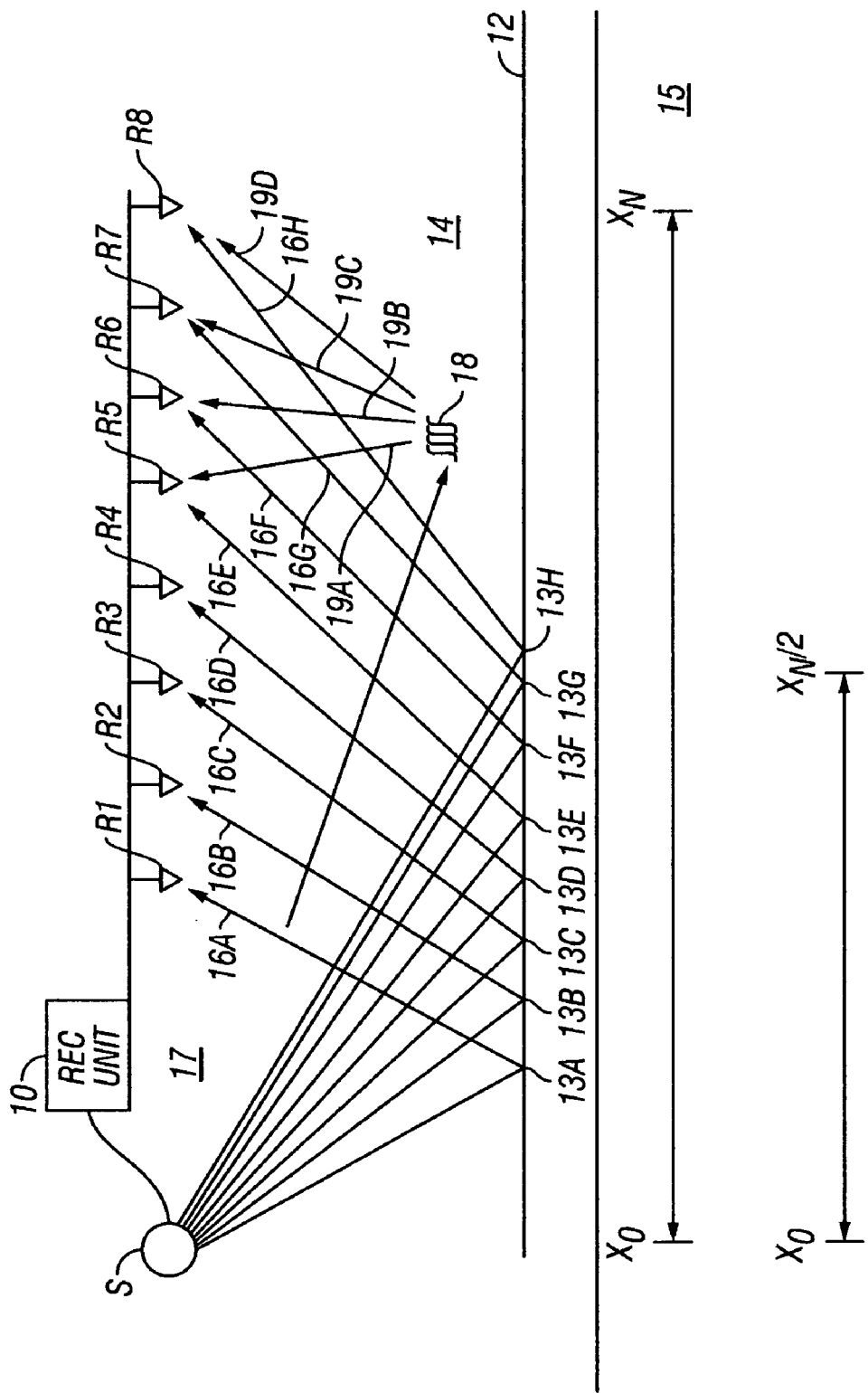
FIG. 1 shows an example of seismic acquisition of data that may be used in embodiments of a method according to the invention.

An example of seismic data acquisition is shown schematically in FIG. 1. A seismic recording unit 10 is placed at a selected position on the Earth's surface. The recording unit 10 includes various control and recording devices (not shown separately) of types well known in the art including a source controller, acquisition controller and multi-channel data recorder. The source controller (not shown separately) is coupled operatively, either by cable as shown in FIG. 1 or by radio telemetry (not shown in FIG. 1), to one or more seismic energy sources, shown generally at S. The source S may be a vibrator, explosive, air gun, water gun or and array of such guns depending on the particular data acquisition arrangement used and whether the acquisition is being performed on land or in a body of water. Any type of seismic energy source known in the art may be used with the invention, and accordingly, the type of source S is not a limitation on the scope of the invention.

A plurality of seismic detectors, or receivers, shown as R1 through R8 in FIG. 1, is disposed generally in a line extending away from the position of the source S. The receivers R1–R8 may be single or multi-component geophones, accelerometers, hydrophones or any other type of seismic detector known in the art. As will be readily appreciated by those skilled in the art, seismic data acquired on land will typically use geophones for the receivers R1–R8. Seismic data acquired from beneath a body of water, such as the ocean, will typically include hydrophones disposed along a cable towed by a seismic vessel (not shown in the Figures), and the recording unit 10 will typically be disposed on the vessel (not shown). OBC systems, as described in the Background section herein, may include combinations of hydrophones and geophones.

FIG. 1 shows a very simplified model of possible subsurface Earth structures in order to explain the invention. At selected times, the source S is actuated, and seismic energy radiates outwardly from the source S in a substantially spherical pattern through the Earth's subsurface, represented by 14, until it reaches an acoustic impedance boundary 12. In the simplified model of FIG. 1, the boundary 12 is substantially horizontal and planar. The seismic energy is reflected in part at the boundary 12, whereupon the reflected energy travels upwardly through the Earth 14 until it is detected by the receivers R1–R8. As will be further explained, the boundary 12 is substantially laterally continuous, and so results in a "specular" reflection of the seismic energy.

As is well known in the art, the seismic energy travels along a path such that its angle of incidence with respect to a line normal to the boundary 12 is substantially equal for both the downward traveling energy and the upwardly traveling reflected energy. Thus, the seismic energy travel path from the source S, to the boundary 12 and back to each receiver R1–R8 is defined by a "ray path" examples of which are shown generally at 16A through 16H, corresponding to the receivers R1–R8. For each ray path 16A–16H, the geographic position of each point of reflection on the boundary 12, occurs substantially at the midpoint of the lineal distance between the source S and each receiver R1–R8. The corresponding reflection points are shown as 13A through 13H. Therefore, assuming a specular reflection, as explained in the Background section herein, the maximum distance from the source S for which specular reflectors, such as planar boundary 12 may be imaged in the subsurface is generally limited to about one half (shown as $X_N/2$) the distance between the most distant one of the receivers ($X_N$) from the source, this receiver being R8 in the example of FIG. 1.

The term "imaging" as used in seismic exploration, includes generating a representation of the spatial positions of various subsurface Earth features by appropriate processing of the seismic signals. Imaging is generally performed by analysis of the apparent seismic velocity of the Earth 14, and calculation of the apparent depth within the Earth of each reflection point 13A–13G based on the determined velocities and on the two-way travel time of the seismic energy from the source S to each receiver R1–R8. Many methods of imaging are known in the art.

As is well known in the art, the quality of the determination of spatial position of various reflection points in the subsurface (13A–13H) may be improved by analysis of other possible ray paths which include the same corresponding subsurface reflection point. Other ray paths having the same subsurface reflection point may be produced by appropriate relocation of the source S and the receivers R1–R8 for subsequent seismic data recordings. Many such techniques are well known in the art.

Irrespective of the actual ray path selection techniques and analysis techniques used in any seismic survey, the position of the most distant subsurface reflection point (e.g., 13H in FIG. 1) that may be correctly imaged using reflection seismic analysis techniques is still limited to about one-half the distance between the seismic energy source and the most distance receiver (e.g., R8 in FIG. 1). This limitation has led to the discovery that it is possible to image subsurface diffractors by analysis of seismic signals corresponding to subsurface positions more distant than $X_N/2$ from the source. In FIG. 1, a diffractor, shown as a fractured zone 18, is located at a subsurface position more distant from the source S than $X_N/2$ along the Earth's surface Seismic energy from the source S travels along all the foregoing paths (16A–16H) and also along path 17 until it reaches the fractured zone 18. As explained in the Background section herein, a diffractor acts with respect to impinging seismic energy substantially as if it were itself a point source of seismic energy. As shown in FIG. 1, diffracted seismic energy travels outwardly from the fractured zone 18 along paths 19A–19D until it is detected by the receivers, shown at R5–R8 in FIG. 1, respectively.

Figure 2B:
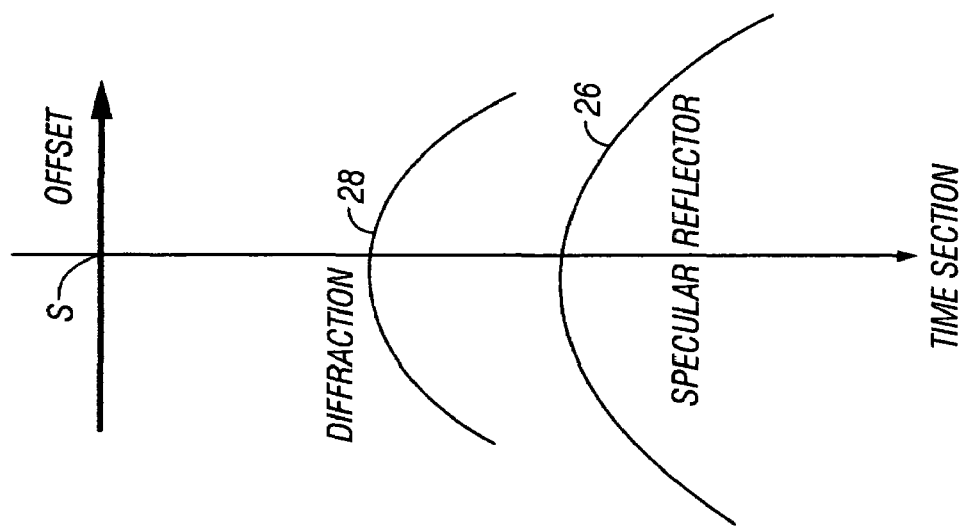
FIGS. 2A and 2B show, respectively, time and depth sections for specular and diffracted waves for near-offset receivers.
Figure 2A:
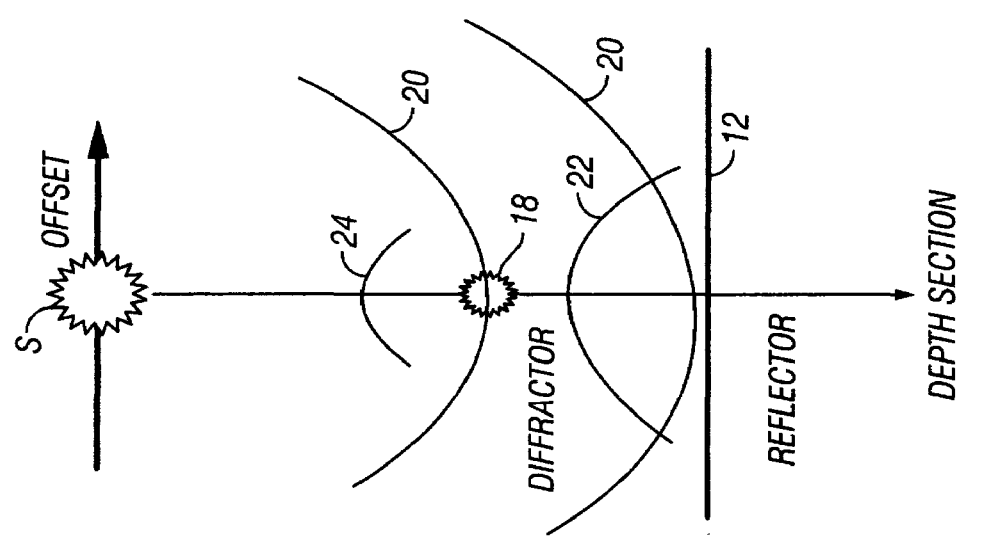

The principle of methods according to the invention can be better understood by referring to FIGS. 2A and 2B. FIG. 2A shows a model of Earth formations including a specular reflector 12 and a diffractor 18. FIG. 2A schematically shows the situation where the source S is located substantially directly over the diffractor position. Seismic energy emanates from the source (shown at position S), travels downwardly in spherical wavefronts 20 and impinges on both the diffractor (which may be a fractured zone as explained with reference to FIG. 1) 18 and the specular reflector (boundary) 12. The seismic energy waves are then reflected from both the planar (specular) reflector 12 and are diffracted by the diffractor 18. Reflected waves from the specular reflector 12 are shown at 22, and the diffracted waves from the diffractor 18 are shown at 24.

Because the specular reflector 12 acts as substantially as planar mirror, a receiver located substantially at the source position S will detected reflect waves 22 from the source S in substantially the same manner as diffracted waves 24 from the diffractor 18. Therefore, distinguishing diffracted waves from reflected waves is difficult at small values of offset (source to receiver distance). As shown in FIG. 2B, which is a schematic representation of a conventional time record section, the diffracted 28 and reflected 26 waves will have similar "moveout" shapes (change in arrival time of a subsurface produced seismic event with respect to offset). The diffracted 28 and reflected 26 waves may even interfere with each other.

Figure 3B:
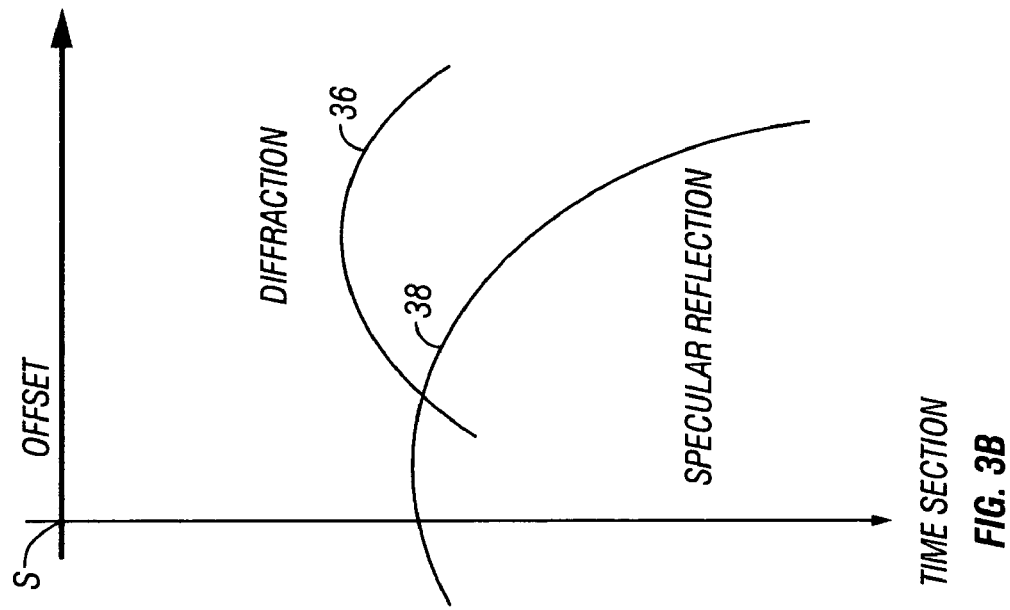
FIGS. 3A and 3B show, respectively, time and depth sections for specular and diffracted waves for far-offset receivers.
Figure 3A:
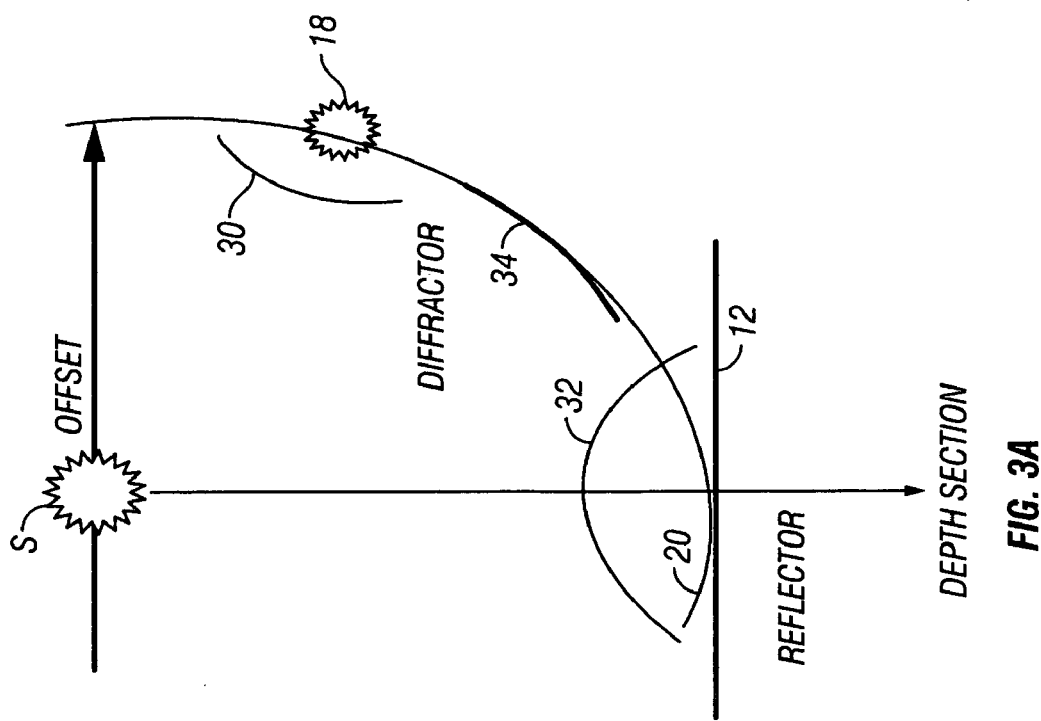

Referring now to FIG. 3A, if the source S is moved to one side of (laterally) the equivalent surface position of the diffractor 18, the image of the diffractor 18 will also move accordingly, leaving the point diffractor wavefield at substantially the same equivalent surface position and having a detection time delay proportional to the increased distance between the point diffractor 18 and the source S. FIG. 3A shows a schematic model of the same arrangement of subsurface Earth formations as FIG. 2A, but in FIG. 3A the source S is now positioned to one side of the equivalent surface location of the diffractor 18. The boundary (specular reflector) 12 is modeled as laterally continuous and so still is at the same apparent depth and is located directly below the source S. The wavefield emanating from the source S downwardly is shown at 20. The downgoing wavefield 20 impinges on both the specular reflector 12 and the diffractor 18. Reflected waves from the specular reflector 12 are shown at 32, and diffracted waves from the diffractor 18 are shown at 30. As shown in FIG. 3B, the reflected wavefield 38 and the diffracted wavefield 36 have distinctly different moveout characteristics and are thus separately identifiable in a time record section. What should be apparent from FIG. 3B is that at sufficiently long offset (meaning at least equal to the previously defined distance $X_N/2$), reflected energy from specular reflectors is substantially absent from the time record section, while diffracted energy will be present in the record section.

The principle of methods according to the invention is similar in nature to side scan sonar or radar. The subsurface is energized with seismic energy that is detected at a relatively high skew angle. Therefore mostly diffracted waves are detected by the receivers, rather than specular reflection waves that are more easily detected at smaller offsets. Therefore, the separation of the specular and diffracted waves takes place mostly in "skew illumination zones", at long offsets. As shown in FIGS. 2A, 2B, 3A and 3B the diffraction pattern is in the form of a migration operator (Green's function) with a delay of travel time from source to diffractor related to the velocity in each Earth layer between the source S and the diffractor 18.

The best separation of specular reflection and diffracted wavefields takes place at offsets exceeding the distance $X_N/2$, as previously explained. As will be readily appreciated by those skilled in the art, Earth formations may have substantial lateral variation in seismic velocity. Therefore, in some embodiments, both the vertical (depth) and lateral variations in Earth formation velocity may be analyzed using methods known in the art. See, for example, Akbar, F. E., Sen, M. K., and Stoffa, P. L, *Prestack plane-wave Kirchhoff migration in laterally varying media*, Geophysics, 61, 1068–1079 (1996). See also, Tanis, M. C., *Prestack Split-step Fourier Depth Migration Algorithms and Parallel Implementation on Cray T3E*, Ph.D. Dissertation, The University of Texas at Austin (1998). Still other methods of vertical and lateral velocity analysis are known in the art. Having determined spatial distribution of Earth velocity, imaging is then performed only at offsets exceeding the distance $X_N/2$. This procedure provides one image plane (along the line of the seismic receivers if so deployed) for each seismic source position. If multiple seismic receiver cables or streamers are used, then it will be possible to generate several image planes, one plane for each seismic receiver cable. These multiple images can be used for quality control and for stacking to generate a diffractor image volume (three dimensional diffractor image)

Figure 4:
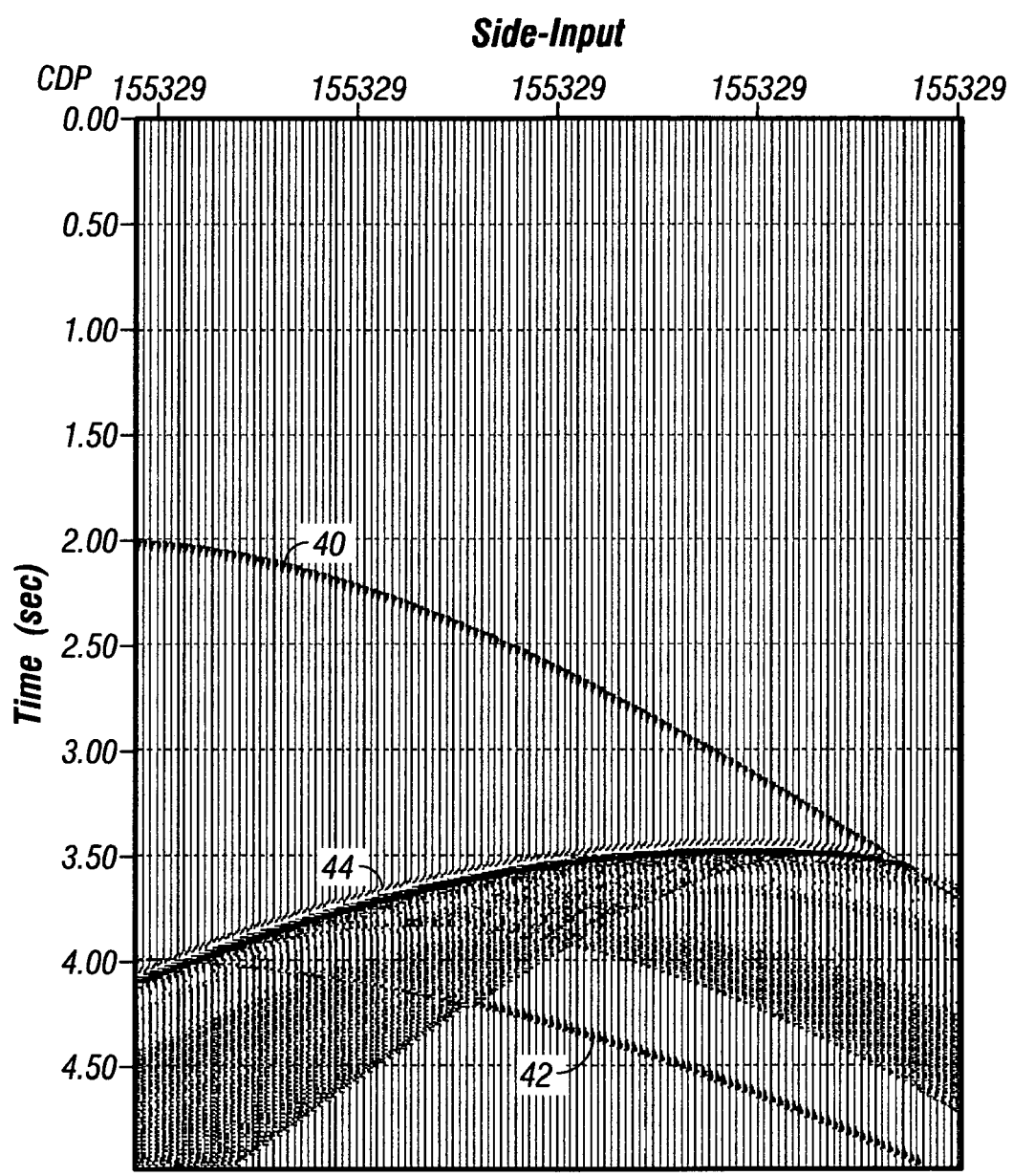
FIG. 4 is a synthetic seismic time section generated using both planar reflectors and point diffractors.

FIG. 4 illustrates the essence of the diffractor imaging method. FIG. 4 displays a synthetic seismic time section, consisting of long offset traces. Synthetic seismic traces were generated using techniques known in the art. Each trace in then synthetic seismic time section of FIG. 4 represents an incremental distance of 50 meters from the seismic source. The source is located on the left hand side of the time section of FIG. 4. Two horizontal, planar reflectors, at 2000 and 4000 meters equivalent depth, respectively, and a number of point diffractors along a dipping line were included in a model used to generate the synthetic time section of FIG. 4. Reflected events from the 2000 meter depth reflector are observable at 40, and reflected events from the 4000 meter depth reflector are observable at 42. Diffracted events are observable at 44.

Figure 5:
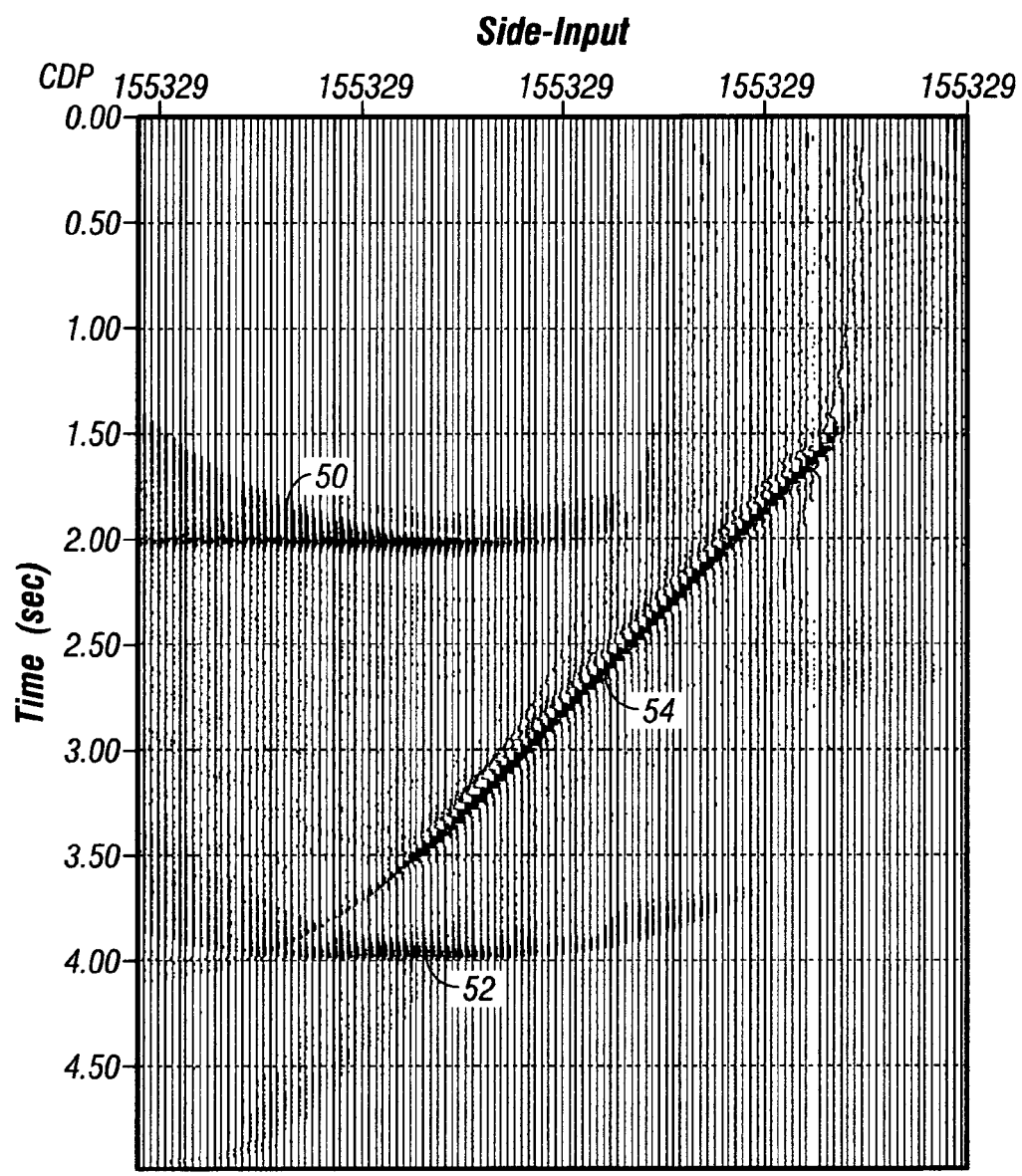
FIG. 5 is a depth migrated section corresponding to the time section of FIG. 4.

The time section of FIG. 4 was the depth migrated using a technique known in the art as Kirchoff migration to produce a depth section shown in FIG. 5. As depicted on FIG. 5, the specular reflector images, 50 and 52, essentially stop about half the distance to the far offset (most distant receiver position), From that point ($X_N/2$) at increasing offset to the farthest offset ($X_N$) is a an area for diffractor imaging essentially clear of specular reflection images, as observable at 54.

Figure 6:
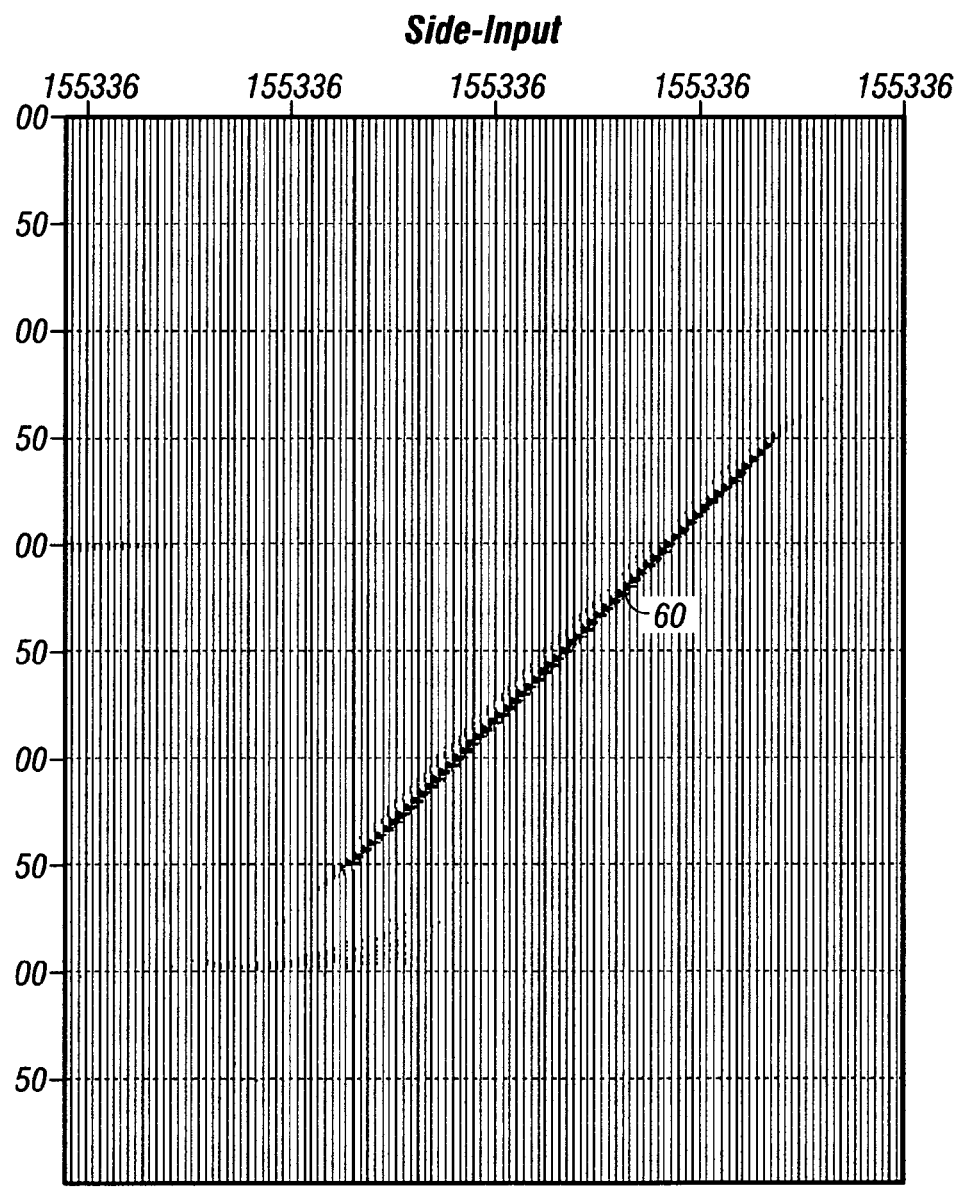
FIG. 6 is an improved depth migrated section corresponding to the depth migrated section of FIG. 5.

Far offsets (long source to receiver distance) typically have poor signal to noise ratio. In addition, the poor signal to noise ratio problem is magnified by spatial aliasing artifacts caused by using Kirchhoff depth migration to generate the depth section. These spatial aliasing events are clearly visible in FIG. 5. To reduce the image degradation caused by spatial aliasing events, in one embodiment a modified Kirchhoff migration method is used in which the time gradient of events is used as additional information to form the images more accurately and without the disturbing artifacts. FIG. 6 shows a depth migrated section using time gradients of events. The spatial aliasing events of FIG. 5 are substantially eliminated in the depth migrated section of FIG. 6, providing the "clean" image of the diffractors observable at 60. Removing the spatial aliasing events may be performed using the following procedure.

Each trace may be processed individually. First, a local τ-p transform (also known in the art as "slant stack" or conventional dip scan) is computed to establish the time gradients of diffraction events at each trace. The time gradient is represented as d(0,t). Next, the normal moveout (NMO) function at each trace is computed using the familiar Dix equation or similar calculation technique. At each image position the dip of the NMO function is computed, represented by d(NMO, x, t). A weight is then calculated according to the trace and image position dips according to the following expression:

$$w(t) = \frac{1}{\{1 + [(d(0, t) - d(NMO, x, t))/DD]^{2n}\}} \quad (1)$$

where DD represents a preselected threshold value. If the difference between the trace dip is more than this value, the calculated weight will rapidly approach zero. Each trace is then weighted with the calculated weights after NMO calculation and add to the partial image trace at each offset location. The foregoing process is repeated as for all possible image locations around a center trace within the imaged area.

Figure 7:
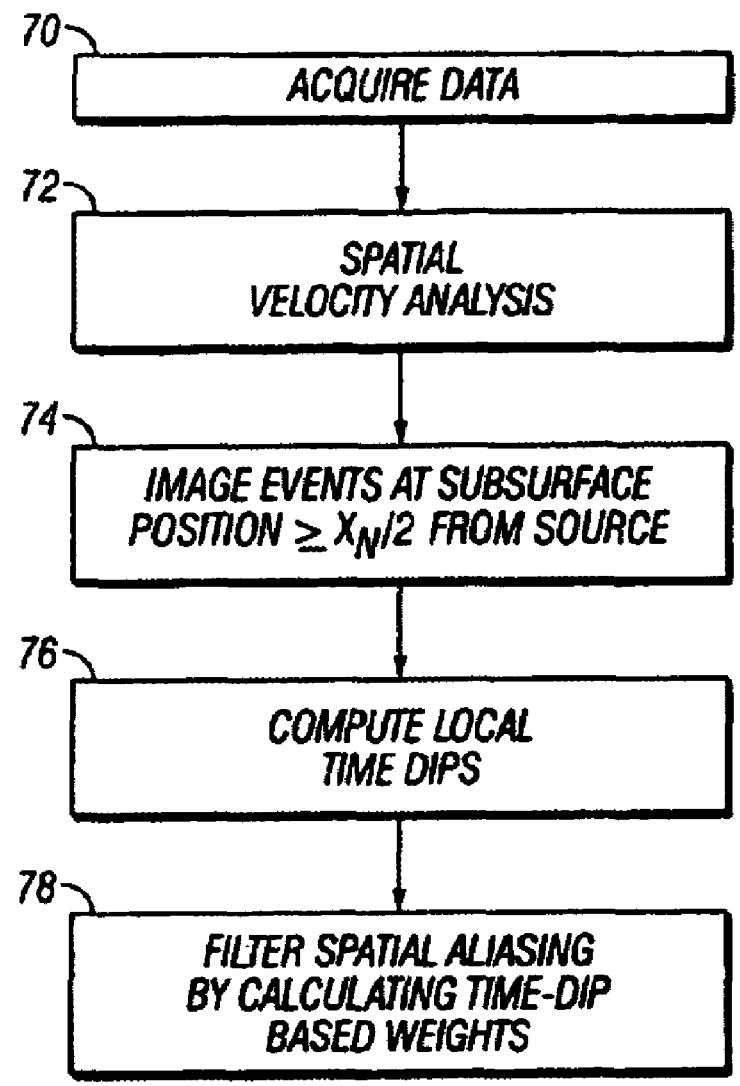
FIG. 7 is a flow chart of one embodiment of a method according to the invention.

An exemplary embodiment of a process according to the invention is shown in flow chart form in FIG. 7. At 70 seismic data are acquired in a conventional manner. At 72 spatial distribution of Earth velocity may be performed by one of a number of methods known in the art. Using the spatial distribution of velocities determined at 72, images may then be generated, at 74 for seismic traces representing subsurface positions at a distance more than one half the longest offset. Improving the image by removing aliasing effects as explained above with reference to equation (1) is shown in FIG. 7 as computing local time dips at 76, and filtering spatial aliasing effects by calculating time-dip based weights at 78.

Figure 8:
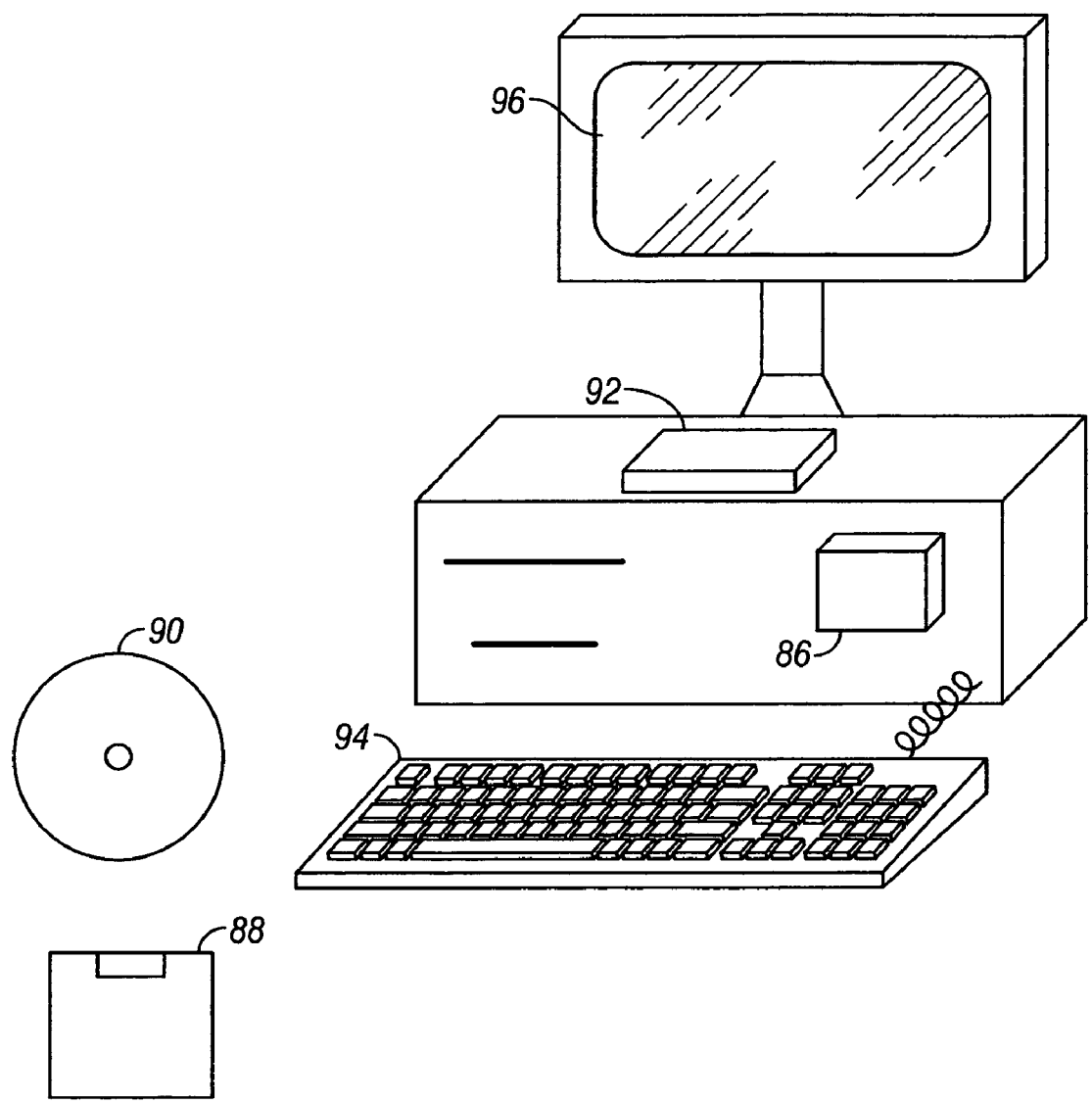
FIG. 8 shows a programmable computer reading a computer-readable medium having a computer program according to the invention thereon.

In another aspect, the invention relates to computer programs stored in a computer readable medium. Referring to FIG. 8, the foregoing process as explained with respect to FIG. 7, can be embodied in computer-readable code stored on a computer readable medium, such as floppy disk 88, CD-ROM 90 or magnetic hard drive 86 forming part of a general purpose programmable computer. The computer, as known in the art, includes a central processing unit 92, a user input device such as a keyboard 94 and a user display 96 such as a flat panel LCD display or cathode ray tube display. According to this aspect of the invention, the computer readable medium includes logic operable to cause the computer to execute steps as set forth above and explained with respect to FIG. 7.

Methods according to the invention can provide good quality subsurface images of diffractive events in the Earth, such as fractured zones. Methods according to the invention provide an improvement over prior art diffractor imaging techniques by using seismic signals which inherently have reduced amplitude of events caused by specular reflectors in the Earth.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for seismic imaging of subsurface diffractors, comprising:
    performing velocity analysis on a seismic time record section;
    depth migrating the time section for offsets exceeding one-half a distance between a seismic energy source and a seismic receiver most distant from the source during acquisition of seismic data used to generate the time record section; and
    determining a time gradient of the diffractors and attenuating spatial aliasing of specular reflective events in the depth migrated section using the time gradient.

2. The method of claim 1 wherein the depth migrating comprises Kirchoff migration.

3. A method for seismic imaging of subsurface diffractors, comprising:
    deploying a seismic energy source at a selected position near the Earth's surface;
    deploying a plurality of seismic receivers at selected positions along the Earth's surface;
    actuating the source at selected times;
    recording signals detected by the receivers;
    performing velocity analysis on a seismic time record section made from the recorded signals;
    depth migrating the time section for offsets exceeding one-half a distance between the source and one of the receivers most distant from the source; and
    determining a time gradient of the diffractors and attenuating spatial aliasing of specular reflective events in the depth migrated section using the time gradient.

4. The method of claim 3 wherein the depth migrating comprises Kirchoff migration.

5. A computer program stored in a computer readable medium, the program having logic operable to cause a programmable computer to perform steps comprising:
    performing velocity analysis on a seismic time record section;
    depth migrating the time section for offsets exceeding one-half a distance between a seismic energy source and a seismic receiver most distant from the source during acquisition of seismic data used to generate the time record section; and
    determining a time gradient of the diffractors and attenuating spatial aliasing of specular reflective events in the depth migrated section using the time gradient.

6. The computer program of claim 5 wherein the depth migrating comprises Kirchoff migration.

* * * * *